(12) United States Patent
Tackstrom et al.

(10) Patent No.: US 12,142,015 B2
(45) Date of Patent: Nov. 12, 2024

(54) AUTO-REGRESSIVE VIDEO GENERATION NEURAL NETWORKS

(71) Applicant: Google LLC, Mountain View, CA (US)

(72) Inventors: Oscar Carl Tackstrom, Stockholm (SE); Jakob D. Uszkoreit, Mountain View, CA (US); Dirk Weissenborn, Berlin (DE)

(73) Assignee: Google LLC, Mountain View, CA (US)

( * ) Notice: Subject to any disclaimer, the term of this patent is extended or adjusted under 35 U.S.C. 154(b) by 394 days.

(21) Appl. No.: 17/609,668

(22) PCT Filed: May 22, 2020

(86) PCT No.: PCT/US2020/034185
§ 371 (c)(1),
(2) Date: Nov. 8, 2021

(87) PCT Pub. No.: WO2020/237136
PCT Pub. Date: Nov. 26, 2020

(65) Prior Publication Data
US 2022/0215594 A1   Jul. 7, 2022

Related U.S. Application Data

(60) Provisional application No. 62/852,271, filed on May 23, 2019.

(51) Int. Cl.
*G06T 9/00*     (2006.01)
*G06N 3/045*    (2023.01)
(52) U.S. Cl.
CPC ............ *G06T 9/002* (2013.01); *G06N 3/045* (2023.01)
(58) Field of Classification Search
None
See application file for complete search history.

(56) References Cited

U.S. PATENT DOCUMENTS

| 2019/0012581 A1 | 1/2019 | Honkala et al. |
| 2019/0035431 A1* | 1/2019 | Attorre ................. G10L 25/30 |
| 2019/0180038 A1* | 6/2019 | Muppalla ................ G06N 3/08 |

FOREIGN PATENT DOCUMENTS

| CN | 103329530 A | 9/2013 |
| CN | 109155850 A | 1/2019 |
| WO | WO 2018089131 A1 | 5/2018 |

OTHER PUBLICATIONS

Office Action in Japanese Appln. No. 2021-569517, dated Mar. 27, 2023, 17 pages (with English Translation).

(Continued)

*Primary Examiner* — Vikkram Bali
(74) *Attorney, Agent, or Firm* — Fish & Richardson P.C.

(57) ABSTRACT

A method for generating a video is described. The method includes: generating an initial output video including multiple frames, each of the frames having multiple channels; identifying a partitioning of the initial output video into a set of channel slices that are indexed according to a particular slice order, each channel slice being a down sampling of a channel stack from a set of channel stacks; initializing, for each channel stack in the set of channel stacks, a set of fully-generated channel slices; repeatedly processing, using an encoder and a decoder, a current output video to generate a next fully-generated channel slice to be added to the current set of fully-generated channel slices; generating, for each channel index, a respective fully-generated channel stack using the respective fully generated channel slices; and generating a fully-generated output video using the fully-generated channel stacks.

20 Claims, 4 Drawing Sheets

(56) References Cited

OTHER PUBLICATIONS

Office Action in Chinese Appln. No. 202080036018.0, dated Sep. 18, 2023, 13 pages (with English Translation).
Babaeizadeh et al., "Stochastic Variational Video Prediction," Presented at Sixth International Conference on Learning Representations, Vancouver, Canada, Apr. 30-May 3, 2018, 15 pages.
Baevski et al., "Adaptive input representations for neural language modeling," Presented at Seventh International Conference on Learning Representations, New Orleans, LA, USA, May 6-9, 2019, 13 pages.
Binkowski et al., "Demystifying MMD GANs," Presented at Sixth International Conference on Learning Representations, Vancouver, Canada, Apr. 30-May 3, 2018, 36 pages.
Carreira et al., "A Short Note about Kinetics-600," arXiv, Aug. 3, 2018, 6 pages.
Carreira et al., "Quo Vadis, Action Recognition? A New Model and the Kinetics Dataset," Proceedings of the IEEE Conference on Computer Vision and Pattern Recognition (CVPR), Jul. 2017, pp. 6299-6308.
Castrejon et al., "Improved conditional vrnns for video prediction," arXiv, Apr. 27, 2019, 10 pages.
Chen et al., "PixelSNAIL: An Improved Autoregressive Generative Model," Proceedings of the 35th International Conference on Machine Learning, Jul. 2018, 9 pages.
Child et al., "Generating Long Sequences with Sparse Transformers," arXiv, Apr. 23, 2019, 10 pages.
De Fauw et al., "Hierarchical autoregressive image models with auxiliary decoders," arXiv, Oct. 8, 2019, 32 pages.
Denton et al., "Stochastic Video Generation with a Learned Prior," Proceedings of the 35th International Conference on Machine Learning, Jul. 2018, 10 pages.
Eber et al., "Self-supervised visual planning with temporal skip connections," Presented at 1st Conference on Robot Learning (CoRL 2017), Mountain View, CA, USA, Nov. 13-15, 2017, 13 pages.
Finn et al., "Unsupervised Learning for Physical Interaction through Video Prediction," Presented at 30th Conference on Neural Information Processing Systems (NIPS 2016), Barcelona, Spain, Dec. 5-10, 2016, 9 pages.
Girdhar et al., "Video Action Transformer Network," arXiv, Dec. 6, 2018, 10 pages.
Heusel et al., "GANs Trained by a Two Time-Scale Update Rule Converge to a Local Nash Equilibrium," Presented at 31st Conference on Neural Information Processing Systems (NIPS 2017), Long Beach, CA, USA, Dec. 4-9, 2017, 12 pages.
International Preliminary Report on Patentability in International Appln. No. PCT/US2020/034185, dated Dec. 2, 2021, 14 pages.
International Search Report and Written Opinion in International Appln. No. PCT/US2020/034185, dated Aug. 28, 2020, 15 pages.
Jia et al., "Dynamic Filter Networks," Presented at 30th Conference on Neural Information Processing Systems (NIPS 2016), Barcelona, Spain, Dec. 5-10, 2016, 9 pages.
Jouppi et al., "In-Datacenter Performance Analysis of a Tensor Processing Unit," Proceedings of the 44th Annual International Symposium on Computer Architecture, Jun. 2017, 12 pages.
Kaiser et al., "Model-Based Reinforcement Learning for Atari," arXiv, Jun. 11, 2019, 18 pages.
Kalchbrenner et al., "Video Pixel Networks," arXiv, Oct. 3, 2016, 16 pages.
Kay et al., "The Kinetics Human Action Video Dataset," arXiv, May 19, 2017, 22 pages.
Kumar et al., "Videoflow: A flow-based generative model for video," arXiv, Jun. 10, 2019, 13 pages.
Lee et al., "Stochastic Adversarial Video Prediction," arXiv, Apr. 4, 2018, 26 pages.
Liu et al., "Video Frame Synthesis Using Deep Voxel Flow," Proceedings of the IEEE International Conference on Computer Vision (ICCV), Oct. 2017, pp. 4463-4471.
Lu et al., "Knowing When to Look: Adaptive Attention via a Visual Sentinel for Image Captioning," Proceedings of the IEEE Conference on Computer Vision and Pattern Recognition (CVPR), Jul. 2017, pp. 375-383.
Mathieu et al.,"Deep multi-scale video prediction beyond mean square error," arXiv, Feb. 26, 2016, 14 pages.
Menick et al., "Generating High Fidelity Images with Subscale Pixel Networks and Multidimensional Upscaling," arXiv, Dec. 4, 2018, 15 pages.
Office Action in Indian Appln. No. 202127053206, dated Apr. 8, 2022, 7 pages (with English Translation).
Oh et al., "Action-conditional video prediction using deep networks in Atari games," NIPS'15: Proceedings of the 28th International Conference on Neural Information Processing Systems, Dec. 2015, 9 pages.
Parikh et al., "A Decomposable Attention Model for Natural Language Inference," Proceedings of the 2016 Conference on Empirical Methods in Natural Language Processing, Nov. 2016, pp. 2249-2255.
Parmar et al., "Image Transformer," Proceedings of the 35th International Conference on Machine Learning, Jul. 2018, 10 pages.
Patraucean et al., "Spatio-temporal video autoencoder with differentiable memory," Presented at 2016 International Conference on Learning Representations, Caribe Hilton, San Juan, Puerto Rico, May 2-4, 2016, 13 pages.
Reed et al., "Parallel Multiscale Autoregressive Density Estimation," Proceedings of the 34th International Conference on Machine Learning, Aug. 2017, 10 pages.
Shi et al., "Convolutional LSTM Network: A Machine Learning Approach for Precipitation Nowcasting," Advances in Neural Information Processing Systems, Dec. 2015, 9 pages.
Srivastava et al., "Unsupervised Learning of Video Representations using LSTMs," Proceedings of the 32nd International Conference on Machine Learning, Jul. 2015, 10 pages.
Unterthiner et al., "Towards Accurate Generative Models of Video: A New Metric & Challenges," arXiv, Dec. 3, 2018, 16 pages.
Van den Oord et al., "Conditional Image Generation with PixelCNN Decoders, " Presented at 30th Conference on Neural Information Processing Systems (NIPS 2016), Barcelona, Spain, Dec. 5-10, 2016, 9 pages.
Van den Oord et al., "Pixel recurrent neural networks, " Proceedings of the 33rd International Conference on Machine Learning, Jun. 2016, 10 pages.
Vaswani et al., "Attention is all you need," arXiv, Jun. 12, 2017, 15 pages.
Vondrick et al., "Anticipating Visual Representations From Unlabeled Video," Proceedings of the IEEE Conference on Computer Vision and Pattern Recognition (CVPR), Jun. 2016, pp. 98-106.
Vondrick et al., "Generating Videos with Scene Dynamics," Presented at 30th Conference on Neural Information Processing Systems (NIPS 2016), Barcelona, Spain, Dec. 5-10, 2016, 9 pages.
Wang et al., "Image quality assessment: From error visibility to structural similarity," IEEE Transactions on Image Processing, Apr. 2004, 13(4):600-612.
Wang et al., "Video quality assessment based on structural distortion measurement," Sig. Proc.: Image Comm., Jan. 2004, 9 pages.
Wang et al., "Video quality assessment using a statistical model of human visual speed perception," Journal of the Optical Society of America A, Dec. 2007, 24(12):B61-B69.
Weissenborn et al., "Scaling Autoregressive Video Models," arXiv, Feb. 4, 2020, 24 pages.
Xie et al., "Rethinking Spatiotemporal Feature Learning: Speed-Accuracy Trade-offs in Video Classification," Proceedings of the European Conference on Computer Vision (ECCV), Sep. 2018, 17 pages.
Zhang et al., "The Unreasonable Effectiveness of Deep Features as a Perceptual Metric," Presented at 2018 IEEE/CVF Conference on Computer Vision and Pattern Recognition (CVPR), Salt Lake City, UT, USA, Jun. 18-23, 2018, pp. 586-595.
Hearing Notice in Indian Application No. 202127053206, dated May 23, 2023, 2 pages (with English Translation).

\* cited by examiner

AUTO-REGRESSIVE VIDEO GENERATION NEURAL NETWORKS

CROSS REFERENCE TO RELATED APPLICATIONS

This application is a National Stage Application under 35 U.S.C. § 371 and claims the benefit of International Application No. PCT/US2020/034185, filed on May 22, 2020, which is a non-provisional of and claims priority to U.S. Provisional Patent Application No. 62/852,271, filed on May 23, 2019. The disclosure of the prior applications are considered part of and are incorporated by reference in the disclosure of this application.

BACKGROUND

This specification relates to a neural network system for video generation.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that implement a video generation neural network system for efficient video generation.

The subject matter described in this specification can be implemented in particular embodiments so as to realize one or more of the following advantages. Generation of videos is a challenging task due to the large number of pixels that needs to be produced and the vast complexity of their joint distribution. The auto-regressive video neural network described in this specification can address the computational challenge posed to conventional video generation models by iteratively generating subscaled video slices in conjunction with an efficient implementation of a block-local self-attention mechanism. In particular, as the cost of splitting videos into blocks is negligible, the described auto-regressive video neural network can significantly reduce memory requirements by applying block-local self-attention on video blocks. The described auto-regressive video neural network can further reduce memory requirements by generating videos in spatial-temporal subscale order. As a result, the described auto-regressive video neural network can be scaled up substantially while retaining longer range spatio-temporal dependencies. This scalability allows a system that implements the auto-regressive video neural network to obtain state-of-the-art results across a range of popular video generation benchmarks and to model real-world videos of an unprecedented complexity.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Video generation is an important task in many applications such as content creation, forecasting, transfer learning and model-based reinforcement learning. However, due to the statistical complexity of video, the high degree of inherent stochasticity, and the sheer amount of data, generating natural videos remains a challenging task. Existing video generation models attempt to address these issues by combining sometimes complex, often video-specific neural network architectures, latent variable models, adversarial training and a range of other methods. Despite their often high complexity, these approaches still fall short of generating high quality video continuations outside of narrow domains and often struggle with fidelity.

In contrast, the video generation neural network system described in this specification can achieve better results across multiple metrics in comparison to existing video generation models because it can produce videos of higher fidelity and realism. The ability to generate plausible videos in a computationally efficient manner make the video generation neural network system described herein particularly useful for real-world applications such as content creation, and camera motion and object or human movement prediction for reinforcement learning tasks such as robotic manipulation and self-driving car control.

Figure 1:
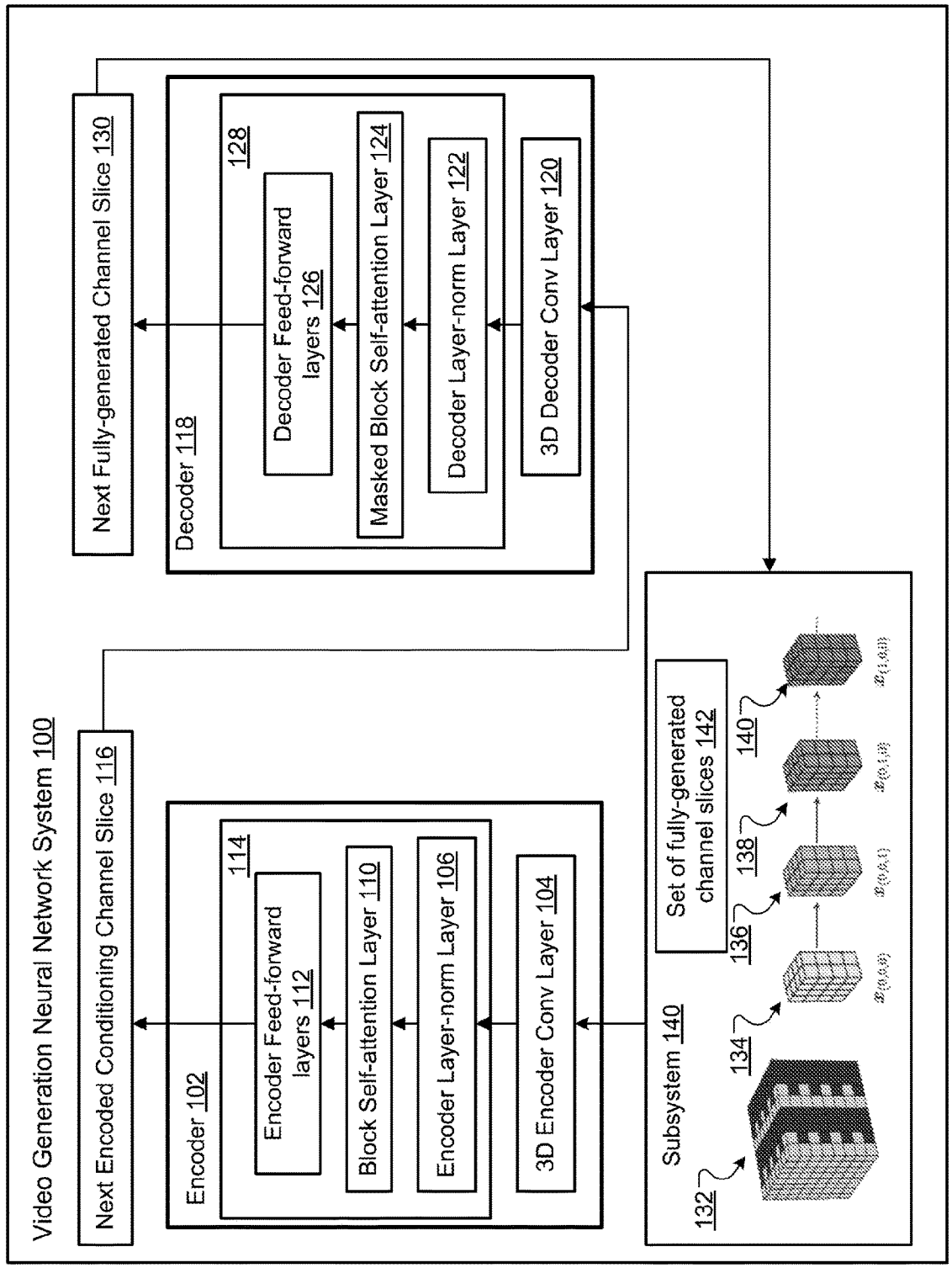
FIG. 1 shows an example video generation neural network system.

FIG. 1 shows an example video generation neural network system 100. The system 100 is an example of a system implemented as computer programs on one or more computers in one or more locations, in which the systems, components, and techniques described below can be implemented.

The system 100 includes an encoder neural network 102 (also referred to as "the encoder 102"), a decoder neural network 118 (also referred to as "the decoder 118"), and a subsystem 140. The subsystem 140 is a system implemented as computer programs on one or more computers in one or more locations, in which the systems, components, and techniques described herein can be implemented.

The system 100 aims to generate a desired output video, which can be denoted as video $\chi \in \mathbb{R}^{T \times H \times W \times N_c}$ with time, height, width and channel dimensions, respectively, $N_c$ is the number of channels of the output video. For example, a video with RGB video frames has three channels: red, green, and blue. A distribution $p(\chi)$ over the video $\chi$ can be modeled by means of a pixel-channel level autoregressive factorization. That is, the joint distribution over pixels is factorized into a product of channel intensities for all $N_c$ channels, for each of the $N_p = T \times H \times W$ pixels, with respect to an ordering $\pi$ over pixels:

$$p(x) = \prod_{i=0}^{N_p-1} \prod_{k=0}^{N_c-1} p(x_{\pi(i)}^k \mid x_{\pi(<i)}, x_{\pi(i)}^{<k}). \tag{1}$$

The ordering π is given by a combination of a subscale- and raster-scan ordering as further detailed below. In some cases, the system 100 may generate the desired output video conditioned on an input. The input can be, for example, an input received from the user of the system 100 or from another system that specifies pixel values of one or more pixels of the output video. In some other implementations, the system 100 may generate the desired output video from scratch.

To generate the desired output video, the system 100 first generates an initial output video 132 using the subsystem 140. The initial output video 132 includes multiple frames. Each of the frames has multiple channels. Each channel is a two-dimensional image and indexed by a respective channel index from a set of channel indices of the initial output video. For example, if each frame has three channels: red, green, and blue, then the set of channel indices is {R, G, B}. As another example, if each frame has four channels: cyan, magenta, yellow, and key, then the set of channel indices is {C, M, Y, K}. For each of the channels, each pixel in the channel is assigned a predetermined pixel value or is padded with a blank pixel.

For example, in some cases, the initial output video 132 is a fully padded video where every single pixel of the video 132 is padded with a blank pixel. In this case, the system 100 uses the decoder neural network 118 to generate the first fully-generated channel slice, pixel by pixel. This process will be described in further detail below. After generating the first channel slice, the system 100 can now partially fill the initial output video 132 with information (including pixel values) from the first fully-generated channel slice.

In some other cases, the system 100 may receive (e.g., from a user of the system 100 or from another system) an input that specifies predetermine pixel values for one or more of the pixels of the video 132. For example, as shown in FIG. 1, the initial output video 132 has some black pixels, which are pixels that are padded with a blank pixel, and some gray pixels, which are pixels that are each assigned a respective predetermined pixel value specified by the input.

The subsystem 140 is configured to identify a partitioning of the initial output video 132 into a set of channel slices (e.g., channel slices 134, 136, 138, 140, . . . ) that are indexed according to a particular slice order. Each channel slice is a down sampling of a channel stack from a set of channel stacks. Each channel stack in the set of channel stacks corresponds to a respective channel index (e.g., channel index R, G or B) and is a stack of channels having the same respective channel index according to time.

In particular, the subsystem 140 evenly divides the initial output video 132 with shape (T, H, W) into a set of smaller channel slices by using a given subscale factor $s=(s_t, s_h, s_w)$. The subscale factor s divides the video 132 into $s=(s_t \cdot s_h \cdot s_w)$ channel slices, each of resolution $(T/s_t, H/s_h, W/s_w)$, as illustrated in the bottom of FIG. 1. The subsystem 140 generates these channel slices in a particular order. For example, the subsystem 140 generates channel slices according to their respective offsets such that it first generates slice $\chi_{(0,0,0)}$ (slice 134 which a down sampling of a channel stack corresponding to channel index C), then $\chi_{(0,0,1)}$ (slice 136 which is a down sampling of a channel stack corresponding to channel index M), $\chi_{(0,1,0)}$ (slice 138 which is a down sampling of a channel stack corresponding to channel index Y), $\chi_{(1,0,0)}$ (slice 140 which is a down sampling of a channel stack corresponding to channel index K), up until slice $\chi_{(s_t-1, s_h-1, s_w-1)}$. Generating all channel slices one at a time in this way can drastically reduce the number of pixels $N_p$ in memory to $N_p/s$, which enables scaling the architecture of the video generation neural network system 100 by a factor of s.

The subsystem 140 is configured to initialize, for each channel stack in the set of channel stacks, a set of fully-generated channel slices. For example, the subsystem 140 may initialize the set of fully-generated channel slices as an empty set, which means there is no fully-generated channel slice in the set at the beginning.

The system 100 repeatedly processes a current output video including the current set of fully-generated channel slices using the encoder 102 and decoder 118 to generate pixel values for each of the s channel slices according to the particular slice order. For the first iteration, the current output video is the initial output video 132. After the channel slice is fully generated (e.g., all pixels in the channel slice are assigned respective values), the channel slice becomes the next fully-generated channel slice to be added to the set of fully-generated channel slices of the respective channel stack.

In particular, the encoder 102 is configured to process the current output video including the current set of fully-generated channel slices of all channel stacks to generate an encoded conditioning channel slice for the current channel slice. The current channel slice can be denoted as $\chi_{(a,b,c)}$, where (a, b, c) denotes the current channel slice index. The encoder 102 includes a 3D encoder convolution layer 104 followed by a stack of multiple encoding self-attention layers 114. Each of the encoding self-attention layers includes an encoder layer-norm layer 106, a block self-attention layer 110, and one or more encoder feed-forward layers 112. The one or more encoder feed-forward layers 112 may be, for example, a multilayer perceptron (MLP).

The encoder 102 processes the current output video using the 3D encoder convolution layer 104 to generate an initial encoder representation. The encoder 102 then transforms this initial encoder representation by a linear projection to a hidden size to generate an intermediate encoder representation and provides the intermediate encoder presentation as input to the stack of encoding self-attention layers 114. The encoder 102 processes the intermediate encoder representation using the stack of encoding self-attention layers 114 to generate the encoded conditioning channel slice for the current channel slice. In some cases, each of the encoding self-attention layers can be parameterized by the same block size and number of attention heads. In some other cases, each of the encoding self-attention layers can be parameterized by a different block size and number of attention heads.

The process for generating the encoded conditioning channel slice using the encoder 102 is described in more detail below with reference to FIG. 3.

The decoder 118 is configured to receive the encoded conditioning channel slice from the encoder 102 and to process the encoded conditioning channel slice to generate pixel values for the current channel slice (i.e., to make the current channel slice become the next fully-generated channel slice). The decoder 118 can be initialized with pixels having predetermined pixel values from the initial output video 132 that are in the next fully-generated channel slice. The decoder 118 includes a 3D decoder convolution layer 120 followed by multiple decoding self-attention layers 128. Each of the decoding self-attention layers includes a decoder layer-norm layer 122, a masked block self-attention layer 124, and one or more decoder feed-forward layers 126. The one or more decoder feed-forward layers 126 may be, for example, a multilayer perceptron (MLP). The process for generating the next fully-generated channel slice using the decoder 118 is described in more detail below with reference to FIG. 4.

The subsystem 140 adds the next fully generated channel slice to the current set of fully-generated channel slices of the respective channel stack.

The system 100 repeats the above process of processing the current output video until all channel slices have been fully generated.

The system 100 generates, for each of the channel indices, a respective fully-generated channel stack using the respective fully generated channel slices. In particular, for each channel index, the subsystem 140 combines all fully-generated channel slices of the respective channel stack to generate the fully-generated channel stack.

The system 100 generates a fully-generated output video using the fully-generated channel stacks generated for the channel indices. In particular, the subsystem 140 combines all fully-generated channel stacks to generate the fully-generated output video (which is the desired output video).

In some implementations, the encoder neural network 102 and the decoder neural network 118 are implemented as computer programs on the same computer system.

In some other implementations, the encoder neural network 102 can be implemented on a first computer system. The encoder neural network 102 can generate next encoded conditioning channel slices for a desired output video and send these encoded conditioning channel slices to the decoder neural network 118 running on a second computer system different from the first computer system. The decoder neural network 118 can then use the encoded conditioning channel slices to generate next fully-generated channel slices that are used to reconstruct the desired output video.

Figure 2:
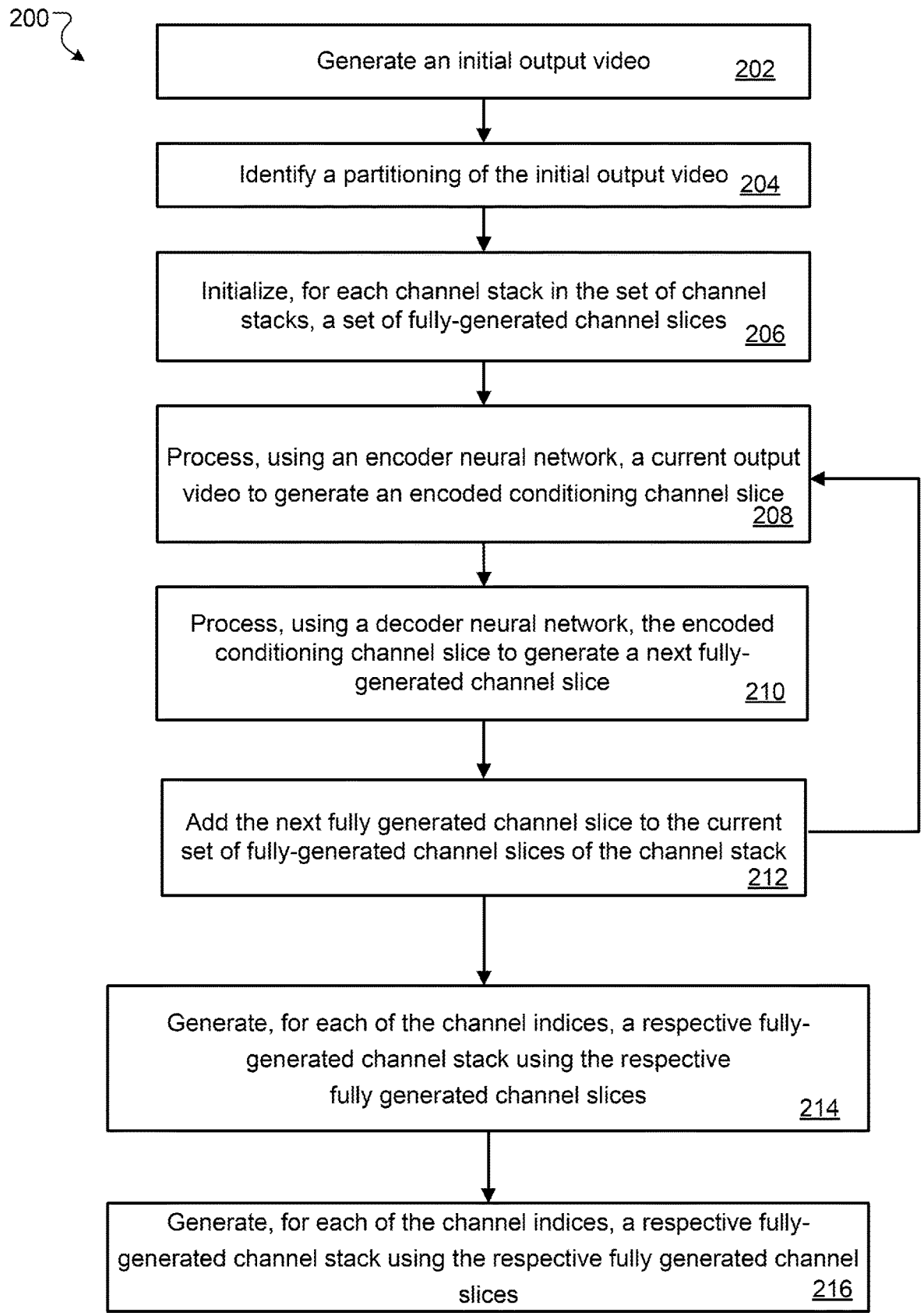
FIG. 2 is a flow diagram of an example process for generating a video.

In some implementations, the encoder 102 and the decoder 118 can be jointly trained using the same loss function. The loss function can be a negative log likelihood of all channel slices, FIG. 2 is a flow diagram of an example process for generating an output video. For convenience, the process 200 will be described as being performed by a system of one or more computers located in one or more locations. For example, a video generation neural network system, e.g., the video generation neural network system 100 of FIG. 1, appropriately programmed in accordance with this specification, can perform the process 200.

The system generates an initial output video including a plurality of frames (step 202). Each of the frames has a plurality of channels. Each channel is a two-dimensional image and indexed by a respective channel index from a set of channel indices of the initial output video. For each channel, each pixel in the channel is assigned a predetermined pixel value or is padded with a blank pixel.

The system identifies a partitioning of the initial output video into a set of channel slices that are indexed according to a particular slice order (step 204). Each channel slice is a down sampling of a channel stack from a set of channel stacks. Each channel stack in the set of channel stacks corresponds to a respective channel index (e.g., channel index R, G or B) and is a stack of channels having the same respective channel index according to time.

In particular, the system evenly divides the initial output video with shape (T, H, W) into a set of smaller channel slices by using a given subscale factor $s=(s_t, s_h, s_w)$. The subscale factor s divides the video 132 into $s=(s_t \cdot s_h \cdot s_w)$ channel slices, each of resolution $(T/s_t, H/s_h, W/s_w)$, as illustrated in the bottom of FIG. 1. The system generates these channel slices in a particular order. For example, the system generates channel slices according to their respective offsets such that it first generates slice $\chi_{(0,0,0)}$ (slice 134 which a down sampling of a channel stack corresponding to channel index Y for yellow), then $\chi_{(0,0,1)}$ (slice 136 which is a down sampling of a channel stack corresponding to channel index G for green), $\chi_{(0,1,0)}$ (slice 138 which is a down sampling of a channel stack corresponding to channel index R for red). $\chi_{(1,0,0)}$ (slice 140 which is a down sampling of a channel stack corresponding to channel index B for blue), up until slice $\chi_{(s_t-1,s_h-1,s_w-1)}$. Generating all channel slices one at a time in this way can drastically reduce the number of pixels $N_p$ in memory to $N_p/s$, which enables scaling the architecture of the system by a factor of s.

The system initializes, for each channel stack in the set of channel stacks, a set of fully-generated channel slices (step 206). For example, the system may initialize the set of fully-generated channel slices as an empty set, which means there is no fully-generated channel slice in the set at the beginning.

The system repeatedly performs steps 208-212 according to the particular slice order.

The system processes, using an encoder neural network, a current output video comprising the current set of fully-generated channel slices of all channel stacks to generate an encoded conditioning channel slice (step 208).

The system processes, using a decoder neural network, the encoded conditioning channel slice to generate a next fully-generated channel slice (step 210).

The system adds the next fully generated channel slice to the current set of fully-generated channel slices of the channel stack (step 212).

After all channel slices have been fully generated, the system generates, for each of the channel indices, a respective fully-generated channel stack using the respective fully generated channel slices (step 214).

The system generates a fully-generated output video using the fully-generated channel stacks generated for the channel indices (step 216).

Figure 3:
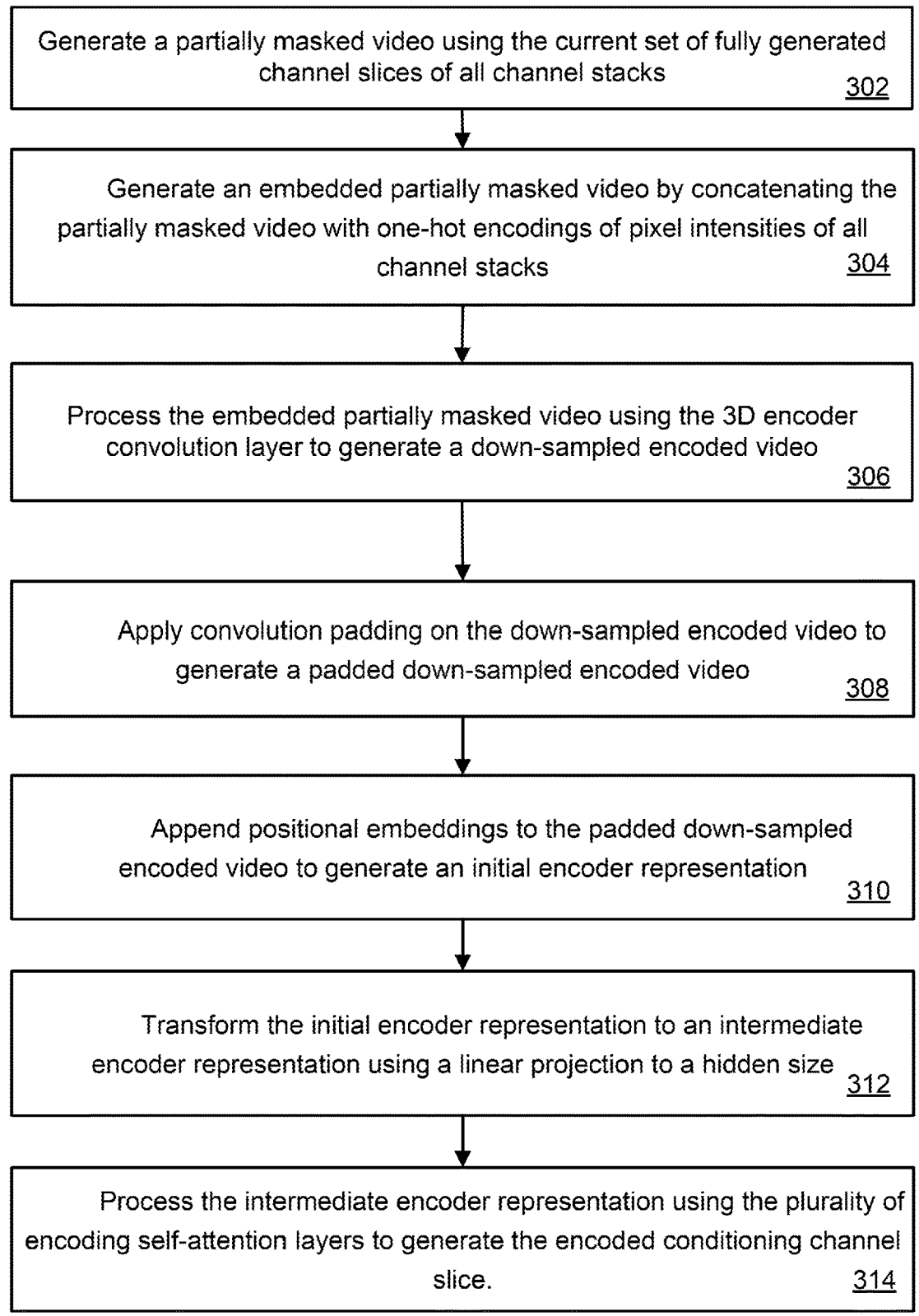
FIG. 3 is a flow diagram of an example process for generating an encoded conditioning channel slice using an encoder neural network.

FIG. 3 is a flow diagram of an example process for generating an encoded conditioning channel slice for a current channel slice (denoted as $\chi_{(a,b,c)}$) using an encoder neural network, for example, the encoder 102 of FIG. 1.

The encoder neural network (hereafter referred to as "the encoder" for simplicity) generates a partially masked video using the current set of fully generated channel slices of all channel stacks, in which only pixels from the current set of fully generated channel slices (i.e., only the pixels of preceding fully generated channel slices $\chi_{<(a,b,c)}$) are visible in the partially masked video (step 302).

The encoder generates an embedded partially masked video by concatenating the partially masked video with one-hot encodings of pixel intensities of all channels (step 304). The pixel intensities of each channel can be discretized pixel intensities.

The encoder processes the embedded partially masked video using the 3D encoder convolution layer to generate a down-sampled encoded video (step 306). For example, the encoder processes the embedded partially masked video using a 3D encoder convolution layer with kernel size $k=(k_1, k_2, k_3)$ and stride s (the subscale factor) to generate a down-sampled encoded video of resolution $(T/s_t, H/s_h, W/s_w)$.

The encoder applies convolution padding on the down-sampled encoded video to generate a padded down-sampled encoded video (step 308). The encoder applies convolution padding depending on the current slice index (a, b, c). In particular, the encoder can pad the down-sampled encoded video with ($\lfloor k_1/2 \rfloor$-a, $\lfloor k_2/2 \rfloor$-b, $\lfloor k_3/2 \rfloor$-c), which "centers" the convolution kernel on the pixels of the current channel slice.

The encoder appends positional embeddings to the padded down-sampled encoded video to generate an initial encoder representation (step 310). More particularly, the encoder adds positional embeddings for each axis of the padded down-sampled encoded video, as well as embeddings for the current slice index (a, b, c), to the padded down-sampled encoded video. The result is the initial encoder representation $z_{(a,b,c)}^0 \in \mathbb{R}^{T/s_t \times H/s_h \times W/s_w \times d_e}$, where $d_e$ is the embedding size. Optionally, the encoder can condition on auxiliary information (e.g., per-frame action values of a robot arm) by concatenating this auxiliary information to the initial encoder representation.

The encoder transforms the initial encoder representation to an intermediate encoder representation using a linear projection to a hidden size d(step 312).

The encoder processes the intermediate encoder representation using a stack of L encoding self-attention layers to generate the encoded conditioning channel slice (step 314), denoted as $z_{(a,b,c)}^L$, which is then used as conditional input to a decoder neural network that generates values for the pixels of the current slice $\chi^{(a,b,c)}$.

In particular, each of the L encoding self-attention layers includes an encoder layer-norm layer, a block self-attention layer, and one or more encoder feed-forward layers. The one or more encoder feed-forward layers may be, for example, a multilayer perceptron (MLP).

Each encoding self-attention layer in a plurality encoding self-attention layers is configured to receive as input a padded video of shape (T, H, W) that includes a set of channel stacks. Each encoding self-attention layer then divides the padded video into a set of smaller video blocks of shape (t, h, w) of length $n_p$=t, h, w. Then each encoding self-attention layer applies a self-attention (or block-local self-attention) mechanism on each of the video blocks independently. Given a block representation $z \in \mathbb{R}^{n_p \times d}$ of hidden size d as input, this amounts to:

$$[q,k,v] = \text{layernorm}(z)W_{qkv}, q,k,v \in \mathbb{R}^{n_p \times d_a}, W_{qkv} \in \mathbb{R}^{d \times 3d_a}, \quad (2)$$

$$A = \text{softmax}(qk^T/\sqrt{d_a}+B)A, B \in \mathbb{R}^{n_p \times d_a}, \quad (3)$$

$$\text{attention}(z) = Av. \quad (4)$$

The attention mechanism can be applied to all video blocks in parallel. The input is first projected to query, key and value representations q, k, v by the encoder layer-norm layer of the encoding self-attention layer (Eq. 2). An attention matrix A is then formed as the scaled dot-product between all query-key pairs qk adding a relative position bias B (Eq. 3). A bias $B_{ij}$ is defined as the sum of per-dimension relative distance biases between element i and j, along each of the time- and spatial dimensions. Finally, the values v are aggregated with respect to the attention weights of the attention matrix A to generate a self-attended output attention($z$) (Eq. 4). It is noted that running block-local self-attention is very efficient in practice as the cost of splitting videos into block is negligible.

The encoding self-attention layer appends self-attended outputs of the set of video blocks to form a multi-headed self-attended output. In particular, the encoding self-attention layer concatenates the output of $n_a$ parallel attention heads in the encoding self-attention layer and project the result by a linear transformation (Eq. 5) before applying a residual connection to form the multi-headed self-attended output $\tilde{z}$.

$$\tilde{z} = [\text{attention}_1(z); \ldots; \text{attention}_{n_a}(z)]W_o + z W_p \in \mathbb{R}^{(n_a \cdot d_a) \times d}, \quad (5)$$

Finally, the encoding self-attention layer processes the multi-headed self-attended output using a final fully-connected neural network layer to generate an output of the block self-attention layer. For example, the multi-headed self-attended output $\tilde{z}$ is passed thug a rectified linear unit (ReLU) activation, followed by a linear transformation and a residual connection as shown in Eq. 6:

$$z' = \text{relu}(\text{layernorm}(\tilde{z})T_1)T_2 + \tilde{z} T_1, T_2 \in \mathbb{R}^{d \times d}, \quad (6)$$

where overloading notion, attention($z$) denotes the block-wise application of self-attention to $z$. Applying layer normalization before each block, rather than after each block can improve training.

In some implementations, to avoid the need for overlaps to connect pixels across blocks, the block sizes can be varied between encoding self-attention layers, which is highly efficient and works well in practice.

Figure 4:
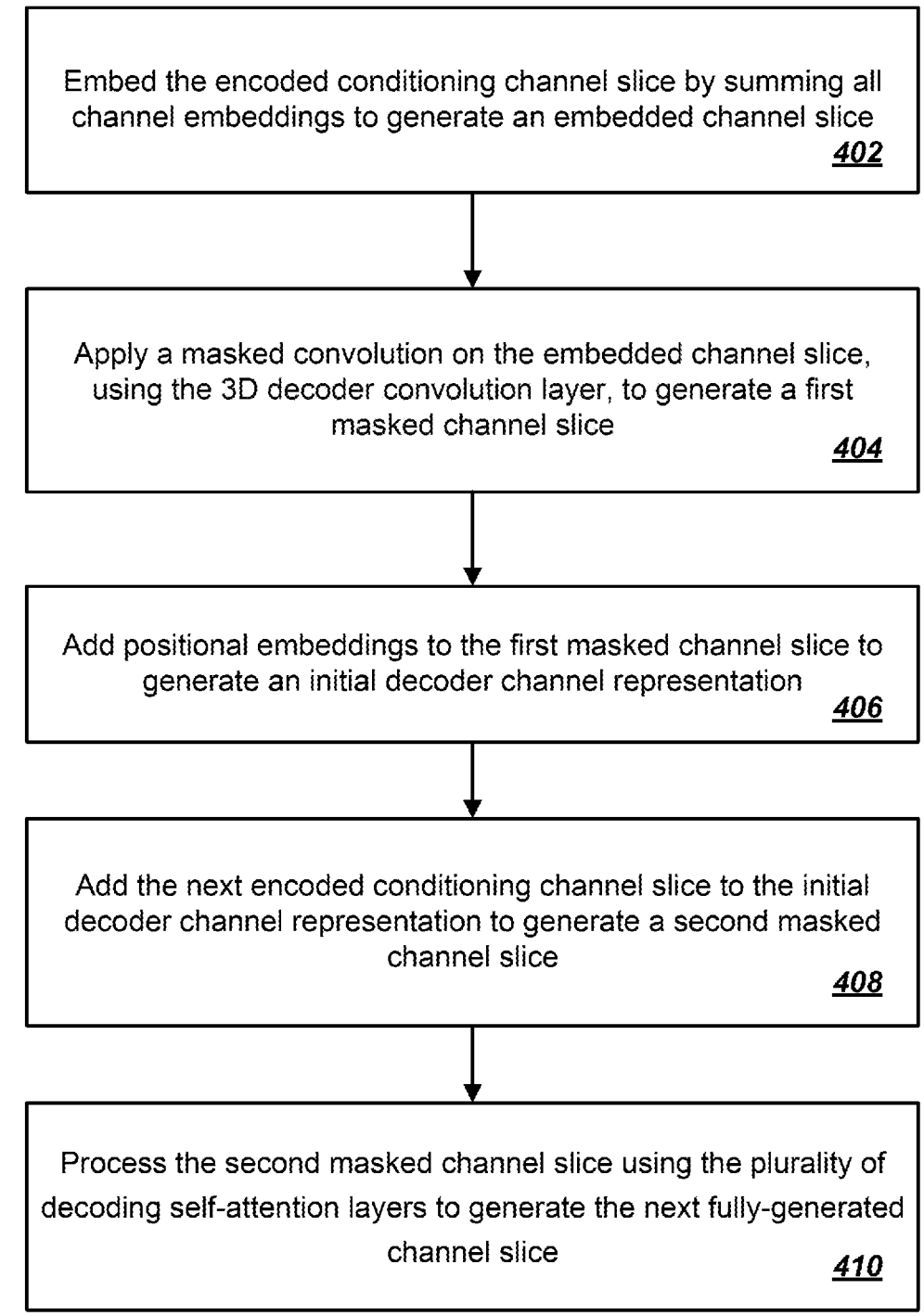
FIG. 4 is a flow diagram of an example process for generating a next fully generated channel slice using a decoder neural network.

FIG. 4 is a flow diagram of an example process for generating, using a decoder neural network, a next fully generated channel slice from an encoded conditioning channel slice provided by an encoder neural network. The decoder neural network can be, for example, the decoder neural network 118 of FIG. 1. The decoder neural network (also referred to as "the decoder" for simplicity) can be almost identical to the encoder neural network in structure, except for the use of masking in the decoder as defined by the particular order for generating fully-generated channel slices.

Generally, the decoder is configured to generate pixel values of the current slice $\chi_{(a,b,c)}$ conditioned on the encoded conditioning channel slice $\tilde{z}_{(a,b,c)}^L$. Specifically, the decoder embeds the encoded conditioning channel slice by summing all channel embeddings of size $d_e$ at every pixel to generate an embedded channel slice (step 402).

The decoder applies a masked convolution (for example, a 3×3×3 masked convolution) on the embedded channel slice, using the 3D decoder convolution layer, to generate a first masked channel slice (step 404).

The decoder adds positional embeddings to the first masked channel slice to generate an initial decoder channel representation (step 406). The initial decoder channel representation can be denoted as $y_{(a,b,c)}^0 \in \mathbb{R}^{T/s_t \times H/s_h \times W/s_w \times d}$ where d is the embedding size.

The decoder adds the encoded conditioning channel slice to the initial decoder channel representation to generate a second masked channel slice (step 408). In particular, the decoder adds a linear projection of $\tilde{z}_{(a,b,c)}^L$ to $y_{(a,b,c)}^0$ to generate the second masked channel slice.

The decoder processes the second masked channel slice using a stack of L decoding self-attention layers with masking to generate pixel values for the current channel slice. The L decoding self-attention layers operate in the same manner as the L encoding self-attention layers as described above with reference to FIG. 3, except for the use of masking. In particular, the decoding self-attention layers are masked so that they do not attend over pixels in the channel slice that have not yet been generated. After all pixel values of the current channel slice are generated, the current channel slice becomes the next fully-generated channel slice, which can be denoted as $y_{(a,b,c)}^L$ (step 410). The next fully-generated channel slice is then added to the set of fully-generated channel slices of the respective channel stack.

In some implementations, the system 100 of FIG. 1 can predict per-pixel channel intensities $\chi_{(a,b,c)}^k$ (the channel slice index (a, b, c) is omitted in the following) for each channel k<$N_c$ by the encoder feed-forward layers 112 and decoder feed-forward layers 126 (e.g., MLPs) with a single hidden layer (Eq. 8), conditioned on the final decoder representation $\mathcal{Y}^L \in \mathbb{R}^{n_p \times d}$. The final decoder representation is itself conditioned on $\mathcal{Z}_{(a,b,c)}^L$ and hence on prior slices $\chi_{<(a,b,c)}$ as well as the preceding channels $(\chi^j)_{j=1 \ldots k-1}$ for each pixel, encoded as one-hot vectors.

$$u^k = [\text{layernorm}(\mathcal{Y}^L); \text{onehot}(\chi^1); \ldots ; \text{onehot}(\chi^{k-1})] U_k, \quad (7)$$

$$p(\chi_i^k | \chi_i^{<k}, \chi_{<i}) = \text{softmax}(\text{relu}(u_i^k)P),$$

$$P \in \mathbb{R}^{d \times N_u}, \; U_k \in \mathbb{R}^{(d+(k-1) \cdot N_u) \times d}, \quad (8)$$

The per video slice loss is defined as the negative log-likelihood as follows:

$$\mathcal{L}(x) = -\sum_{i=0}^{n_p-1} \sum_{k=0}^{N_c-1} \ln p(x_i^k | x_i^{<k}, x_{<i}). \quad (9)$$

This loss can be used to jointly train the encoder neural network and the decoder neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks. e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating a video, the method comprising:
    generating an initial output video including a plurality of frames, wherein each of the frames has a plurality of channels, each channel being a two-dimensional image and indexed by a respective channel index from a set of channel indices of the initial output video, and wherein, for each channel, each pixel in the channel is assigned a predetermined pixel value or is padded with a blank pixel;
    identifying a partitioning of the initial output video into a set of channel slices that are indexed according to a particular slice order, wherein each channel slice is a down sampling of a channel stack from a set of channel stacks, and wherein each channel stack in the set corresponds to a respective channel index and is a stack of channels having the respective channel index according to time;
    initializing, for each channel stack in the set of channel stacks, a set of fully-generated channel slices;
    repeatedly performing the following operations according to the particular slice order:
        processing, using an encoder neural network, a current output video comprising the current set of fully-generated channel slices of all channel stacks to generate an encoded conditioning channel slice, wherein the encoder neural network comprises a plurality of encoding self-attention layers, wherein each of the plurality encoding self-attention layers is configured to receive as input a padded video that is a representation of the current output video and includes a set of channel stacks, divide the padded video into a plurality of video blocks, and apply a self-attention mechanism on each of the plurality of video blocks,
        processing, using a decoder neural network, the encoded conditioning channel slice to generate a next fully-generated channel slice, and
        adding the next fully generated channel slice to the current set of fully-generated channel slices of the channel stack;

generating, for each of the channel indices, a respective fully-generated channel stack using the respective fully generated channel slices; and generating a fully-generated output video using the fully-generated channel stacks generated for the channel indices.

2. The method of claim 1, wherein the encoder neural network comprises a 3D encoder convolution layer followed by a plurality of encoding self-attention layers, wherein each encoding self-attention layer comprises: an encoder layer-norm layer, a block self-attention layer, and one or more encoder feed-forward layers.

3. The method of claim 2, wherein for each channel stack, processing, using the encoder neural network, the current set of fully-generated channel slices of all channel stacks to generate the encoded conditioning channel slice comprises:

generating a partially masked video using the current set of fully generated channel slices of all channel stacks, wherein only pixels from the current set of fully generated channel slices are visible in the partially masked video, generating an embedded partially masked video by concatenating the partially masked video with one-hot encodings of pixel intensities of all channels, processing the embedded partially masked video using the 3D encoder convolution layer to generate a down-sampled encoded video, applying convolution padding on the down-sampled encoded video to generate a padded down-sampled encoded video, appending positional embeddings to the padded down-sampled encoded video to generate an initial encoder representation, transforming the initial encoder representation to an intermediate encoder representation using a linear projection to a hidden size, and processing the intermediate encoder representation using the plurality of encoding self-attention layers to generate the encoded conditioning channel slice.

4. The method of claim 3, wherein processing, using the decoder neural network, the encoded conditioning channel slice to generate the next fully generated channel slice comprises:

embedding the encoded conditioning channel slice by summing all channel embeddings at every pixel to generate an embedded channel slice, applying a masked convolution on the embedded channel slice, using the 3D decoder convolution layer, to generate a first masked channel slice, adding positional embeddings to the first masked channel slice to generate an initial decoder channel representation, adding the encoded conditioning channel slice to the initial decoder channel representation to generate a second masked channel slice, processing the second masked channel slice using the plurality of decoding self-attention layers to generate the next fully-generated channel slice.

5. The method of claim 4, wherein each of the plurality decoding self-attention layers is configured to:

receiving as input a padded video having a set of channel stacks, dividing the padded video into a set of video blocks having the same block size, for each video block in the set of video blocks, applying a self-attention mechanism on the video block to generate a self-attended output, appending self-attended outputs of the set of video blocks to form a multi-headed self-attended output, and processing the multi-headed self-attended output using a final full-connected neural network layer to generate an output of the masked block self-attention layer.

6. The method of claim 5, wherein the attention mechanism is applied to all video blocks in parallel.

7. The method of claim 5, wherein the final fully-connected neural network layer comprises a rectified linear unit (RLU).

8. The method of claim 5, wherein the block self-attention layers in the a plurality encoding self-attention layers have varying block sizes.

9. The method of claim 2, wherein each of the plurality encoding self-attention layers is configured to:

for each video block in the set of video blocks, apply a self-attention mechanism on the video block to generate a self-attended output, append self-attended outputs of the set of video blocks to form a multi-headed self-attended output, and process the multi-headed self-attended output using a final fully-connected neural network layer to generate an output of the block self-attention layer.

10. The method of claim 9, wherein the self-attention mechanism is applied to all video blocks in parallel.

11. The method of claim 9, wherein the final fully-connected neural network layer comprises a rectified linear unit (RLU).

12. The method of claim 9, wherein the block self-attention layers in the stack of a plurality encoding self-attention layers have different block sizes.

13. The method of claim 1, wherein the decoder neural network comprises a 3D decoder convolution layer followed by a plurality of decoding self-attention layers, wherein each decoding self-attention layer comprises: a decoder layer-norm layer, a masked block self-attention layer, and one or more decoder feed-forward layers.

14. The method of claim 1, wherein the encoder neural network and the decoder neural network are jointly trained.

15. The method of claim 14, wherein a loss function of the training process is a negative log likelihood of all channel slices.

16. The method of claim 1, wherein processing, using a decoder neural network, the encoded conditioning channel slice to generate the next fully-generated channel slice comprises:

initializing the decoder neural network with pixels having predetermined pixel values from the initial output video that are in the next fully-generated channel slice.

17. A system comprising one or more computers and one or more storage devices storing instructions that, when executed by the one or more computers, cause the one or more computers to perform operations comprising:

generating an initial output video including a plurality of frames, wherein each of the frames has a plurality of channels, each channel being a two-dimensional image and indexed by a respective channel index from a set of channel indices of the initial output video, and wherein, for each channel, each pixel in the channel is assigned a predetermined pixel value or is padded with a blank pixel;

identifying a partitioning of the initial output video into a set of channel slices that are indexed according to a particular slice order, wherein each channel slice is a down sampling of a channel stack from a set of channel stacks, and wherein each channel stack in the set corresponds to a respective channel index and is a stack of channels having the respective channel index according to time;

initializing, for each channel stack in the set of channel stacks, a set of fully-generated channel slices;

repeatedly performing the following operations according to the particular slice order:

processing, using an encoder neural network, a current output video comprising the current set of fully-generated channel slices of all channel stacks to generate an encoded conditioning channel slice, wherein the encoder neural network comprises a plurality of encoding self-attention layers, wherein each of the plurality encoding self-attention layers is configured to receive as input a padded video that is a representation of the current output video and includes a set of channel stacks, divide the padded video into a plurality of video blocks, and apply a self-attention mechanism on each of the plurality of video blocks, processing, using a decoder neural network, the encoded conditioning channel slice to generate a next fully-generated channel slice, and adding the next fully generated channel slice to the current set of fully-generated channel slices of the channel stack;

generating, for each of the channel indices, a respective fully-generated channel stack using the respective fully generated channel slices; and generating a fully-generated output video using the fully-generated channel stacks generated for the channel indices.

18. The system of claim 17, wherein the encoder neural network comprises a 3D encoder convolution layer followed by a plurality of encoding self-attention layers, wherein each encoding self-attention layer comprises: an encoder layer-norm layer, a block self-attention layer, and one or more encoder feed-forward layers.

19. The system of claim 17, wherein the decoder neural network comprises a 3D decoder convolution layer followed by a plurality of decoding self-attention layers, wherein each decoding self-attention layer comprises: a decoder layer-norm layer, a masked block self-attention layer, and one or more decoder feed-forward layers.

20. One or more non-transitory computer storage media storing instructions that, when executed by one or more computers, cause the one or more computers to perform operations comprising:

generating an initial output video including a plurality of frames, wherein each of the frames has a plurality of channels, each channel being a two-dimensional image and indexed by a respective channel index from a set of channel indices of the initial output video, and wherein, for each channel, each pixel in the channel is assigned a predetermined pixel value or is padded with a blank pixel;

identifying a partitioning of the initial output video into a set of channel slices that are indexed according to a particular slice order, wherein each channel slice is a down sampling of a channel stack from a set of channel stacks, and wherein each channel stack in the set corresponds to a respective channel index and is a stack of channels having the respective channel index according to time;

initializing, for each channel stack in the set of channel stacks, a set of fully-generated channel slices;

repeatedly performing the following operations according to the particular slice order:

processing, using an encoder neural network, a current output video comprising the current set of fully-generated channel slices of all channel stacks to generate an encoded conditioning channel slice, wherein the encoder neural network comprises a plurality of encoding self-attention layers, wherein each of the plurality encoding self-attention layers is configured to receive as input a padded video that is a representation of the current output video and includes a set of channel stacks, divide the padded video into a plurality of video blocks, and apply a self-attention mechanism on each of the plurality of video blocks, processing, using a decoder neural network, the encoded conditioning channel slice to generate a next fully-generated channel slice, and adding the next fully generated channel slice to the current set of fully-generated channel slices of the channel stack;

generating, for each of the channel indices, a respective fully-generated channel stack using the respective fully generated channel slices; and generating a fully-generated output video using the fully-generated channel stacks generated for the channel indices.

* * * * *